Feb. 11, 1964  W. T. SNOW, JR., ET AL  3,120,728
CONVEYOR SHRINK COVER MACHINE
Filed Jan. 6, 1961  2 Sheets-Sheet 1
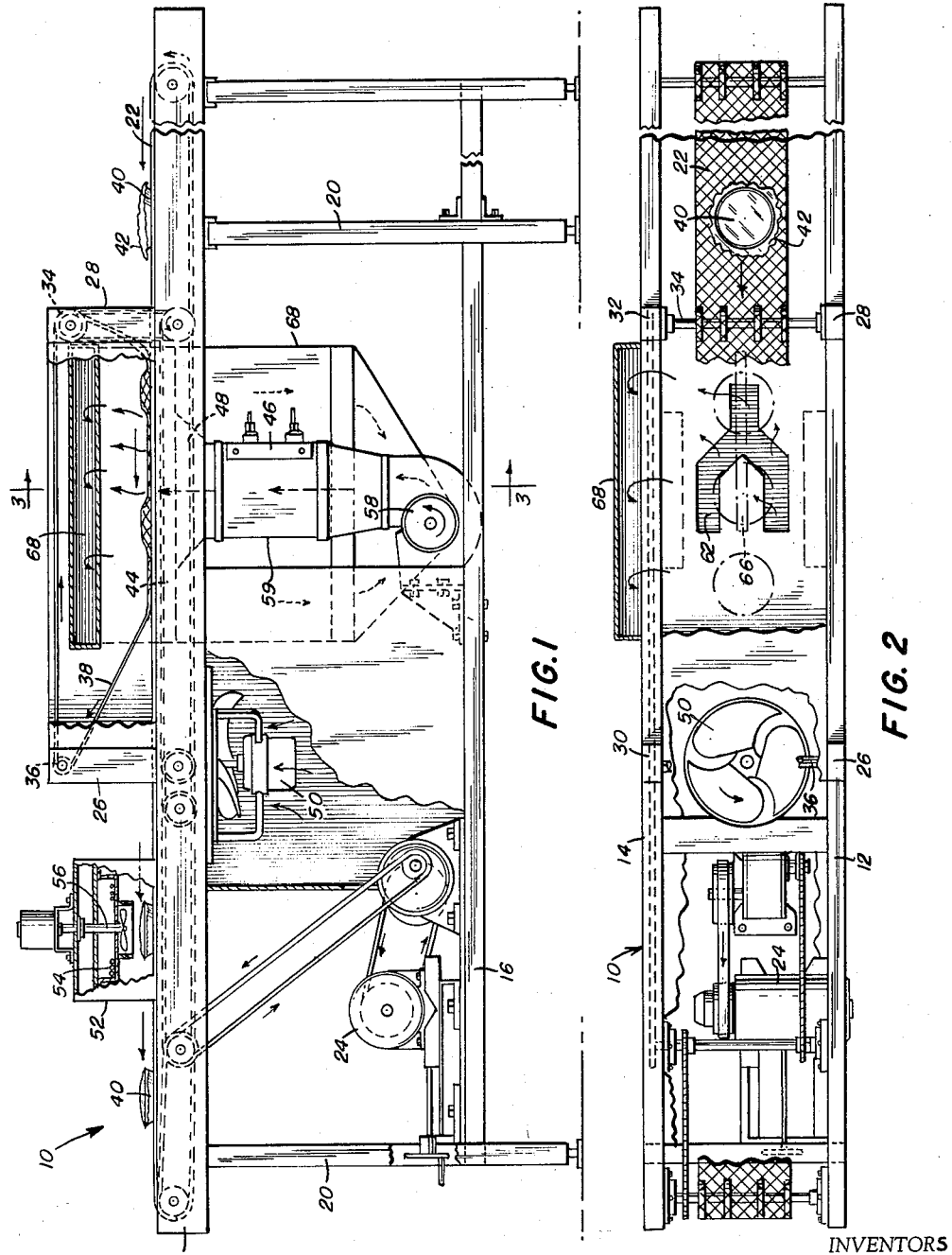
INVENTORS
WILLIAM T SNOW JR.
THOMAS E FORD
JOHN W HARRISON
BY Cushman, Darby & Cushman
ATTORNEYS Feb. 11, 1964        W. T. SNOW, JR., ET AL        3,120,728
CONVEYOR SHRINK COVER MACHINE
Filed Jan. 6, 1961                                2 Sheets-Sheet 2
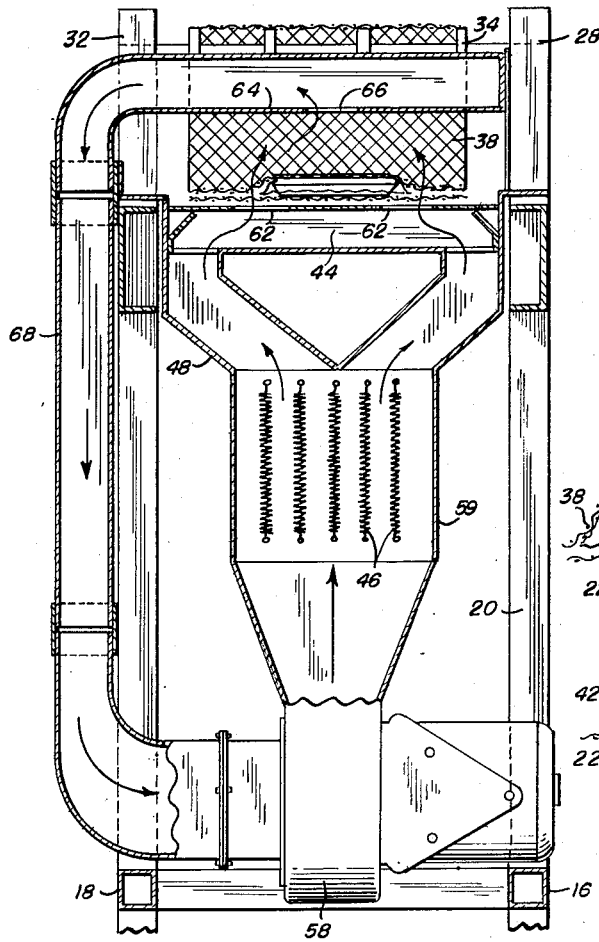
FIG. 3
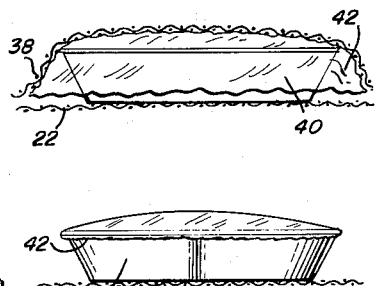
FIG. 5
FIG. 6
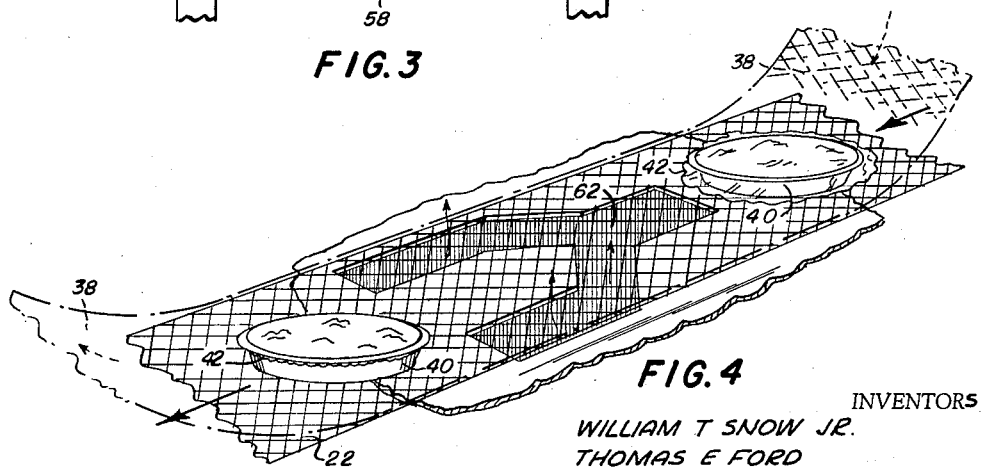
FIG. 4
INVENTORS
WILLIAM T SNOW JR.
THOMAS E FORD
JOHN W HARRISON
BY Cushman, Darby & Cushman
ATTORNEYS United States Patent Office 3,120,728
Patented Feb. 11, 1964

3,120,728
CONVEYOR SHRINK COVER MACHINE
William T. Snow, Jr., Wakefield, Thomas E. Ford, Arlington, and John W. Harrison, Winchester, Mass., assignors to W. R. Grace & Co., Cambridge, Mass., a corporation of Connecticut
Filed Jan. 6, 1961, Ser. No. 81,191
14 Claims. (Cl. 53—42)

The invention described herein relates to an apparatus for packaging raised products and more specifically the invention relates to an apparatus for packaging raised products wherein at least the central portion of the products extend upwardly above the rim in the container in which they are held.

This invention is an improvement over the apparatus disclosed in co-pending Carpenter et al. application, Serial No. 675,903, filed August 2, 1957, now Patent No. 3,034,- 271, issued May 15, 1962.

In the Carpenter application there is described and illustrated an apparatus for producing a packaged product wherein the container having the product carried therein has applied thereto a shrinkable cover material. The container with the product and cover is carried on a conveyor and passes under a pair of belts which hold the cover material in the proper position over the container. Adjacent each side of the conveyor are means which direct heat to the edge portions of the cover material, the cover material being heat-shrinkable is caused to shrink against the side walls of the container. When the covered container leaves the wrapping zone, it subsequently passes through a heated chamber which completes the final shrinking of the cover material.

The improved development disclosed in the instant invention presents a simplified construction. Rather than require a plurality of hold-down belt members to properly position the cover a single loosely-supported belt is used. Rollers, vertically spaced from the conveyor, support the single belt which is loosely draped and is in contact with the conveyor along a portion of its area. The packaged product being carried by the conveyor passes under the loosely-supported belt, which due to its loosely hanging position, drapes the cover material which has been applied to the product and container over the product and over a portion of the container walls. A current of heated air is directed upwardly through the conveyor and a portion of the cover which extends over the side walls of the container is progressively exposed to this heated fluid which causes shrinking of the cover material against the walls of the container. After the container passes from under the loosely-hanging belt, means are provided to cool that portion of the cover material which has been subjected to heat. When the covered container passes from the cooling zone, it subsequently enters and passes through a chamber having an atmosphere of elevated temperature and final shrinkage of the cover material occurs.

The primary object of the invention is an apparatus of simple construction used in applying heat-shrinkable covers to containers of various configurations having the raised product carried therein.

Other objects and advantages of the invention will readily appear by referring to the following description when taken with the accompanying drawings wherein:

FIGURE 1 is a side elevation with parts in section illustrating the loosely-supported belt member and its relation to the conveyor, the cooling means, and the heated chamber through which the packaged product passes in the last stage of its movement along the conveyor.

FIGURE 2 is a top plan view with parts in section illustrating the opening through which heat is conducted to the packaged product and in dotted lines the relative size and position of the opening in the return air duct.

FIGURE 3 is a sectional view taken on line 3—3 of FIGURE 1 illustrating the heating system and duct means used to convey heat for the initial shrinking stage of the cover material and the air return duct assembly.

FIGURE 4 is a fragmentary perspective of the apparatus illustrating the packaged product upon which the cover material has been applied, passing under the loosely-hanging belt and the product after the exterior portions of the cover material have been shrunk into engagement with the side walls of the container.

FIGURE 5 is an enlarged fragmentary sectional view illustrating the draped relation of the loosely-hanging belt over the container which has had a cover material applied thereon.

FIGURE 6 illustrates the product after having had the cover material shrunk completely into engagement with the side walls and the top of the product carried in the container.

Referring to FIGURE 1, there is shown the preferred embodiment of the present invention. The packaging apparatus 10 is comprised of a plurality of elongated upper frame members 12 and 14, lower elongated frame members 16 and 18, one each of which is shown, secured at their ends to supports 20. A foraminous conveyor 22 is supported between upper frame members 12 and 14 and driven by pulleys operatively connected to a suitable source of power 24, secured to the lower frame members 16 and 18.

A plurality of vertical supports 26, 28, 30 and 32 are secured to the upper frame members 12 and 14, two of these 26 and 28, are shown. A drive roll 34 is secured between support members 28 and 32 and an idler roll 36 is secured between supports 26 and 30. A foraminous belt member 38 is supported by drive roll 34 and idler roll 36. The belt member 38 is of a length greater than the distance between rolls 34 and 36 and therefore hangs rather loosely therefrom. The length of the loosely hanging belt member 38 may be such that it comes in contact with the conveyor 22, however, this is not necessary for the operation of the apparatus. All that is necessary is that the belt member 38 is close enough to the conveyor 22 whereby a cover applied to the container passing under the belt 38 is caused to drape over the side wall portion of the container. The drive means for belt member 38 and conveyor 22 are inter-connected whereby both the conveyor 22 and the belt member 38 are driven at the same speed.

As illustrated a container 40 carrying a product having a raised central portion has a sheet of heat shrinkable material 42 placed in overlying relation thereto. The cover sheet 42 may be either round or square as long as it is of a dimension greater than the dimension of the container to be covered. The use of a square sheet is preferred. The container 40 is moved by the conveyor 22 whereby it will pass under the loosely-hanging belt member 38. The speed of the belt member 38 being the same as that of conveyor 22, the heat shrinkable cover 42 is maintained in its proper position in overlying relation to the container 40 and the product carried therein.

When the container 40 passes under the belt member 38, the overlying cover material 42 will be draped so as to extend over a portion of the side walls of the container as shown in detail by the drawing in FIGURE 5.

Adjacent the underside of the top flight of conveyor 22 is a plenum chamber 44 which is in communication with a source of heat from a heater 46. The heater forms part of a heat-circulating system, which will later be described in more detail. An opening is provided in the upper surface of the plenum chamber 44 through which heat from the heater 46 passes and comes in contact with the exterior portions of the cover material which has been draped over the side walls of the conveyor by the loosely hanging belt member 38. The opening in the plenum chamber lies in the path of travel of the container whereby the cover material is heated progressively and is caused to shrink against the side walls of the container 40. The container 40 may be provided with a lip or rim around its upper periphery and if such is the case the cover material when subjected to the heat from the heater 46 will be caused to shrink into engagement with the underside of the rim rather than into engagement with the wall portions of the container.

As the container 40 emerges from under the belt member 38, after having the exterior portions of the heat shrinkable cover 42 shrunk into engagement with the container, it passes through a cooling zone where air at room temperature is blown upwardly through the foraminous conveyor 22 against the portions of the cover material which have been subjected to heat. The means for forcing the draft of cooling air up through the conveyor 22 is a fan 50 which is suspended from the upper frame members 12 and 14.

During the passage of the container 40 under belt member 38, the upper portion of the heat-shrinkable cover material 42 has not been substantially effected by the heat from heater 46 and in order to insure complete shrinkage of the cover, the container 40 passes through a chamber 52 having an atmosphere of elevated temperature. The temperature is elevated by means of heater 54 and circulating fan 56. Flap members (not shown) cover the inlet and outlet opening of the chamber 52 in order to prevent any substantial heat loss from within the chamber. As the container 40 passes through the chamber 52, the elevated temperature causes complete shrinking of the overlying portions of the cover material 42.

In FIGURE 2 there is shown the configuration of the opening 62 in the plenum chamber 54. Also shown is the relative size and position of the air return opening 66 in the return conduit. The opening 66 is represented by dotted lines. The opening 62 in the plenum chamber 44 is substantially Y-shaped, whereby the covered container 40 moving along the conveyor 22 passes first over the leg portion of the Y-shaped openings and then continues over the portions forming the branches of the Y. In this manner, progressive heating of the cover material occurs with the leading edges of the cover being first contacted by the current of the heated air and then the subsequent heating of the remaining draped portions of the cover material 42.

In FIGURE 3 there is shown the details of the primary heating system which causes the shrinking of the cover material 42 against the side walls of the container 40. A fan 58 is positioned between lower frame members 16 and 18. Secured to the outlet side of the fan is a conduit 59 in which resides heater 46. The fan 58 forces a current of air through the conduit 59 and over the heater 46 positioned therein. The heated air follows the conduit through the bifurcated portion 48 into the plenum chamber 44 from which it passes through the Y-shaped opening 62 and impinges against the draped exterior portions of the cover material 42 causing the same to shrink into engagement with the side walls of the container 40.

Positioned within the area defined by the upper belt member 38 is a conduit 64 having an inlet opening 66. The heated air expelled through the opening 62 in the plenum chamber 44 is returned to the inlet side of the fan 58 through conduit 68 having been drawn through opening 66 in return air duct 64. The area of the opening 66 in the plenum chamber 44 is substantially greater than the opening 66 in the return conduit 64. Because of this the heated air flowing through opening 62 is caused to pass around the container 40, insuring complete heating and shrinking of the cover material around the walls of the container.

In FIGURE 4 in perspective there is shown a portion of the apparatus illustrating the container 40 carrying the raised product which has a heat-shrinkable cover material 42 placed in overlying relation thereon during its passage under loosely-hanging belt member 38. The container is also shown after having passed over the opening 62 in the plenum chamber through which the current of heated air passes whereby the portions of the cover material 42 which have been draped over the side walls of the container 40 by belt 38 have been shrunk into engagement with the side walls thereof.

In FIGURE 5 there is shown an enlarged fragmentary sectional view of the container 40 carrying the raised product supported on the foraminous conveyor 22. Also shown, is the manner in which the heat shrinkable cover material 42 is caused to drape over the side walls of the container 40 by the loosely-hanging belt member 38.

In FIGURE 6 there is shown the container 40 on conveyor belt 22 after the complete operation of shrinking the cover material 42 into engagement with the side walls of the container 40 and also after the container has passed through the heated chamber 52 whereby the portion of the cover 42 overlying the product has also been completely shrunk. As previously stated if the container 40 is provided with a lip or rim portion, the cover material 42 will be shrunk into engagement with the underside thereof rather than into engagement with the side walls of the container.

Although the invention has been described in its preferred embodiments, many modifications and variations will become readily apparent to those skilled in the art. However, such variations and modifications are considered to be within the spirit and scope of the appended claims.

We claim:

1. An apparatus for packaging a raised product carried in a container having a cover overlying said container and product and formed of a heat shrinkable material and comprising a conveyor for moving said container and product carried therein, a loosely hanging belt member supported by means spaced above said conveyor, said loosely hanging belt member being sufficiently close to said conveyor to drape over the container, product and cover during the passage of the same along said conveyor and to cause the edge portions of the cover to drape over the container, and heating means for heating at least the draped portion of the cover to cause the same to shrink.

2. An apparatus as defined in claim 1 wherein said loosely hanging belt member is constructed from a flexible foraminous material.

3. An apparatus as defined in claim 1 wherein said conveyor is a flexible foraminous belt member.

4. An apparatus as defined in claim 1 wherein said loosely hanging belt member is sufficiently close to said conveyor to engage the same.

5. An apparatus as defined in claim 1 wherein said means for directing a current of heated gas includes a heater having an inlet and outlet spaced from said conveyor, means defining a plenum chamber adjacent the underside of said conveyor, means in communication with the outlet of said heater and said plenum chamber to conduct heat from said heater to said plenum chamber, means defining an outlet in the upper surface of said plenum chamber, conduit means spaced from said plenum chamber and having wall portions defining an inlet opening, said conduit being in communication with said heater inlet whereby heated air passed through said outlet in said plenum chamber is returned to said heater inlet.

6. An apparatus as defined in claim 5 wherein the area defined by said outlet means in said plenum chamber is greater than the inlet area defined by, and in the wall portion of said conduit means.

7. An apparatus as defined in claim 5 wherein said conduit means is spaced vertically over at least a portion of the means defining the outlet in said plenum chamber.

8. An apparatus for packaging a raised product carried in a container having a cover overlying said container and product and formed of a heat shrinkable material and comprising a conveyor for moving said container and product carried therein, a loosely hanging belt member supported by means spaced above said conveyor, said loosely hanging belt member being sufficiently close to said conveyor to drape over the container, product and cover during the passage of the container under said belt member, means for directing a current of heated gas between said belt member and conveyor and thereby into contact with the drape portions of the heat-shrinkable cover whereby the cover is caused to shrink into engagement with the container.

9. An apparatus for packaging raised products carried in a container having a cover overlying said container and product and formed of a heat shrinkable material and comprising a foraminous conveyor for moving said container and product, a loosely hanging foraminous belt member supported over said conveyor, and under which the covered container and product moved by said conveyor passes, said belt member causing the cover to drape over the product and a portion of the walls of the container carrying the product, means defining an opening adjacent the underside of said conveyor, and in communication with a source of heated gas, whereby heat is directed through said conveyor and against the exterior portions of said cover during its passage along said conveyor.

10. An apparatus as defined in claim 9 including cooling means to cool the portions of said cover material which have been heated.

11. An apparatus as defined in claim 10 wherein said cooling means includes a fan.

12. An apparatus as defined in claim 9 which further includes means defining a heating chamber spaced longitudinally from said loosely hanging belt member and through which the container, product carried therein and the overlying cover may pass.

13. An apparatus as defined in claim 9 wherein said loosely hanging belt member engages said conveyor.

14. The method of packaging a raised product carried in a container having a heat-shrinkable cover overlying said container comprising: conveying said container, product and cover along a predetermined path; simultaneously draping a loosely hanging belt member over said container, product and cover to cause the edge portion of said cover to drape over said container; and simultaneously heating the draped edge portions of the cover to cause the same to shrink.

References Cited in the file of this patent

UNITED STATES PATENTS

| | | |
|---|---|---|
| 1,987,231 | Engel | Jan. 8, 1935 |
| 2,484,780 | Clunan et al. | Oct. 11, 1949 |
| 2,696,680 | Nauman et al. | Dec. 14, 1954 |
| 2,904,943 | Dreyfus et al. | Sept. 22, 1959 |
| 2,932,927 | Segerstrom et al. | Apr. 19, 1960 |
| 2,976,655 | Dreyfus et al. | Mar. 28, 1961 |
| 3,017,729 | Cheeley | Jan. 23, 1962 |
| 3,034,271 | Carpenter et al. | May 15, 1962 |